United States Patent [19]

Allen et al.

[11] Patent Number: 5,201,949
[45] Date of Patent: Apr. 13, 1993

[54] TIO2 MANUFACTURING PROCESS

[75] Inventors: Alvin Allen, Claymont; Glenn R. Evers, Wilmington, both of Del.

[73] Assignee: E. I. du Pont de Nemours and Company, Wilmington, Del.

[21] Appl. No.: 887,415

[22] Filed: May 20, 1992

Related U.S. Application Data

[63] Continuation of Ser. No. 641,804, Jan. 16, 1991, abandoned, which is a continuation of Ser. No. 430,895, Oct. 31, 1989, abandoned, which is a continuation of Ser. No. 298,809, Jan. 18, 1989, abandoned, which is a continuation of Ser. No. 60,875, Jun. 12, 1987, abandoned, which is a continuation-in-part of Ser. No. 853,423, Apr. 18, 1986, abandoned.

[51] Int. Cl.$^5$ .............................................. C09C 1/36
[52] U.S. Cl. .................................. 106/436; 106/450; 423/613
[58] Field of Search ................. 106/436, 450; 423/613

[56] References Cited

U.S. PATENT DOCUMENTS

| | | | |
|---|---|---|---|
| 3,208,866 | 9/1965 | Lewis et al. | 106/436 |
| 3,214,284 | 10/1965 | Wilson | 106/436 |
| 3,329,483 | 7/1967 | Evans et al. | 23/202 |
| 3,356,456 | 12/1967 | Wilson | 23/202 |
| 3,433,594 | 3/1969 | Wilson et al. | 23/202 |
| 3,434,799 | 3/1969 | Wilson | 23/202 |
| 3,485,583 | 12/1969 | Wilson | 23/202 |
| 3,505,091 | 4/1970 | Santos | 106/436 |
| 3,640,745 | 2/1972 | Darr et al. | 106/436 |

FOREIGN PATENT DOCUMENTS 0876672 9/1961 United Kingdom .

Primary Examiner—Mark L. Bell
Assistant Examiner—Willie J. Thompson
Attorney, Agent, or Firm—David J. Gould

[57] ABSTRACT

Titanium dioxide pigment prepared by the high pressure (e.g., 10-200 PSIG) oxidation of TiCl$_4$ vapor is improved with respect to carbon black undertone, specific surface area, and gloss properties by the addition of a nucleant consisting essentially of a cesium substance which is present in the amount of about 8-2,000 parts per million, based on the weight of the TiO$_2$. The foregoing process is also used wherein the residence time of the reactants in the mixing zone of the reactor is about 1-16 milliseconds.

25 Claims, No Drawings

TIO₂ MANUFACTURING PROCESS

This is a continuation of application Ser. No. 07/641,804, filed Jan. 16, 1991, which is a continuation of application Ser. No. 07/430,895, filed Oct. 31, 1989, which is a continuation of application Ser. No. 07/298,809, filed Jan. 18, 1989, which is a continuation of application Ser. No. 07/060,875, filed Jun. 12, 1987, which is a continuation-in-part of application Ser. No. 853,423, filed Apr. 18, 1986, all of which are abandoned.

BACKGROUND OF THE INVENTION

The preparation of pigmentary titanium dioxide by oxidizing titanium tetrachloride in the vapor state with an oxygen-containing gas is well known. Useful procedures therefore include those described in U.S. Pat. Nos. 2,488,439; 2,488,440; 2,559,638; and 2,833,627.

U.S. Pat. Nos. 2,488,439 and 2,488,440 also disclose that the addition of small, controlled amounts of water or hydrogenous water formers to the $TiCl_4$ or oxidizing gas reactants promotes nucleation and production of a high quality pigment having a high carbon black undertone or CBU. CBU is described in U.S. Pat. No. 2,488,440 (which is hereby incorporated by reference) and is a measure of particle size. The higher the carbon black undertone, the smaller the particle size and the higher the quality of the pigment for many applications. However, at increased oxygen concentrations and a corresponding allowable increase in reactor throughput, water becomes a less effective nucleant.

U.S. Pat. No. 3,208,866 discloses generally an improvement in the production of $TiO_2$ pigment by the oxidation of $TiCl_4$ which comprises utilizing a metal ion nucleant selected from the group consisting of sodium, potassium, lithium, rubidium, cesium, calcium, barium, strontium and cerium. In accordance with such patent, incorporating the nucleant results in improved bulk density and carbon black undertone. Such patent also discloses that potassium chloride is preferred and that cesium chloride is less active than potassium chloride.

U.S. Pat. No. 3,505,091 describes another improvement in the production of $TiO_2$ pigment by the oxidation of $TiCl_4$ which comprises conducting the reaction at a pressure of about 20–400 pounds per square inch gage, in the presence of $AlCl_3$. In accordance with such patent, the resulting $TiO_2$ exhibits improved resistance to chalking.

U.S. Pat. No. 3,640,745 discloses a process for producing agglomerated pigmentary $TiO_2$ by vapor phase oxidation of titanium halide in a reaction chamber at elevated temperatures in the presence of minor amounts of (1) an alkali metal, water soluble inorganic compounds of alkali metals or water insoluble organic compounds of alkali metals, (2) an auxiliary gas, and (3) minor amounts of water.

In modern processes for the production of $TiO_2$ by the oxidation of $TiCl_4$, potassium chloride is generally the preferred nucleant. Also in such modern processes, $TiO_2$ often is produced in reactors (1) operating at high pressures to reduce process equipment size and lower investment, and/or (2) having a short residence time of the reactants in the mixing zone of the reactor to increase product output. At such high pressures and/or short residence times, however, it appears that the effectiveness of potassium chloride (especially with respect to carbon black undertone, gloss and specific surface areas) can be reduced. In addition, this reduction in effectiveness generally is apparent even if the concentration of potassium chloride is increased. Consequently, despite the above advances in $TiO_2$ production technology, there exists a need for a nucleant which produces increased $TiO_2$ carbon black undertone, specific surface area and gloss properties while operating at high pressures, short residence times of the reactants in the mixing zone of the reactor or both conditions. It should be noted that there is an increasing need for such $TiO_2$ pigment because modern end uses increasingly require these properties.

SUMMARY OF THE INVENTION

In accordance with this invention there is provided a process for producing pigmentary titanium dioxide which comprises:
(a) reacting titanium tetrachloride and an oxygen containing gas in the vapor phase,
at a reaction zone temperature of at least about 800° C., and at a pressure of at least about 10 pounds per square inch gage,
in the presence of water vapor in the amount of about 50–100,000 parts per million, based on the weight of the $TiO_2$ under production, and a nucleant consisting essentially of a cesium substance wherein the cesium substance is present in the amount of about 8–2,000 parts per million, based on the weight of the $TiO_2$ under production, and
(b) thereafter recovering the resulting titanium dioxide pigment.

There is also provided by this invention the foregoing process wherein the residence time of the reactants in the mixing zone of the reactor is about 1–16 milliseconds.

Additionally, there is provided in accordance with this invention, a process for producing pigmentary titanium dioxide which comprises.
(a) reacting titanium tetrachloride and an oxygen containing gas in the vapor phase,
at a reaction zone temperature of at least about 800° C. and at a residence time of the reactants in the mixing zone of the reactor of about 1–16 milliseconds,
in the presence of water vapor in the amount of from about 50–100,000 parts per million, based on the $TiO_2$ under production, and a nucleant consisting essentially of a cesium substance wherein the substance is present in the amount of about 8–2,000 parts per million, based on the weight of the $TiO_2$ under production, and
(b) thereafter recovering the resulting titanium dioxide pigment.

In accordance with this invention it has been found that the use of a cesium substance under the foregoing process conditions can improve carbon black undertone, specific surface area, and gloss compared to the use of potassium chloride. It also has been found that such improvement generally is evident even if the concentration of the potassium chloride is substantially increased. Moreover, it is believed that cesium can exhibit similar improvements, under the foregoing process conditions, when compared to other commercially used or commercially practical nucleants.

Finally, it has been found that the use of the cesium substance can permit higher $TiO_2$ output while still maintaining the desired or targeted level of CBU and/or gloss.

DETAILED DESCRIPTION OF THE INVENTION

The titanium tetrachloride and the oxygen containing gas are reacted in the presence of a nucleant consisting essentially of a cesium substance. By nucleant is meant any substance which can reduce the particle size of the pigment, such as a cesium substance or metals, oxides, salts or compounds of sodium, potassium, lithium, rubidium, calcium, barium, strontium, or mixtures thereof. By consisting essentially is meant that a nucleant other than a cesium substance can be present, provided that it is selected, and is present in such an amount that it does not negate or nullify the benefits of the cesium substance such as improved carbon black undertone, specific surface area and gloss. By cesium substance is meant any form of cesium or a mixture of various forms of cesium which can reduce the particle size of the $TiO_2$ pigment including cesium metal, cesium salts, cesium oxides and other compounds of cesium.

If a cesium substance is used with a nucleant other than a cesium substance, then such nucleant typically will not be present in an amount in excess of that specified hereinafter for the cesium substance. Preferably, such nucleant will be present in an amount less than that of the cesium substance.

Examples of cesium substances include cesium oxide, cesium halides (chlorides, iodides, bromides, fluorides), nitrates, phosphates, carbonates, sulfates, acetates, alcoholates, benzoates, hydroxides and oxides. Preferred is the use of cesium salts or water solutions of cesium salts such as cesium iodide, cesium chloride or cesium carbonate. Especially preferred are cesium chloride and cesium carbonate. Anions of the salt can be used which contribute color; however, they should not be employed where coloration is undesirable. Also, it is desirable that the cesium substance be substantially volatile at the reaction temperatures utilized for production of the $TiO_2$. Most preferably, the nucleant will consist of a cesium substance.

Procedures for adding the nucleants of this invention are described in U.S. Pat. No. 3,208,866 which is hereby incorporated by reference. Specifically, the nucleants are preferably added to or incorporated in the reactant oxygen gas stream being charged to the reactor, either as a finely divided solid, as a water solution, as a nonaqueous solution, as a molten salt, or as a colloidal, dispersion. If desired, the nucleants may be charged directly into the reaction zone or to the mixed or mixing reactants just ahead of the actual flame of the reaction. Sometimes a third inert gas ("spacing gas") may be introduced into the reactor to prevent deposition of solids on the inlet area of the reactor. This spacing gas stream may be used as a carrier for the nucleants of this invention. Solutions of various nucleant salts of this invention can be sprayed into the gas stream and conveyed into the reaction as a mist. Also, they may be conveyed as fine solids or smoke. When the spacing gas is inert such as argon, it may carry the nucleant in elemental vapor form by suitable injection means or by use of any other desired means.

The use of water solutions of the soluble salts of the nucleants of this invention provides an excellent means of controlling product properties and compensating for variations in other process conditions. For example, the amount of a given salt solution used can be varied to hold the carbon black undertone value constant. To provide more accurate control without varying the amount of water vapor used, two salt solutions of different concentration can be provided and blended as desired at constant water consumption. These solutions are usually made up with pure agents. However, the presence of other substances which are not deleterious can be tolerated. Mixtures of salts can also be effective. Naturally occurring solutions and brines which contain the nucleants of this invention and which are free of discoloring ions may be used if clear or clarified of silt and other debris.

The amount of the cesium substance present should be at least about parts per million, based on the weight of the $TiO_2$ under production. Preferably, the cesium substance will be present in an amount of at least about 10 parts per million and most preferably about 12 parts per million. The maximum amount of the cesium substance will be about 2,000 parts per million, based on the $TiO_2$ under production. Preferably, the cesium substance will be present in an maximum amount of about 1,000 parts per million and most preferably about 500 parts per million. Therefore, typical operating ranges include the following: about 8-2,000 parts per million, about 10-2,000 parts per million, about 12-2,000 parts per million, about 8-1,000 parts per million, about 10-1,000 parts per million, about 12-1,000 parts per million, about 8-500 parts per million, about 10-500 parts per million, and about 12-500 parts per million. An especially preferred range of cesium substance is about 8-200 parts per million, based on the $TiO_2$ under production. A more especially preferred range is about 20-200 parts per million, based on the $TiO_2$ under production. A very much preferred range is about 8-250 parts per million, based on the $TiO_2$ under production. The amount of the cesium substance is based on the weight of the cesium or the cesium component of the cesium salt, cesium oxide or cesium compound used.

Preferably, there is incorporated in the reaction zone vaporous $AlCl_3$ in the amount of about 0.1 to 10 percent, based on the weight of the $TiCl_4$. The method for incorporating the $AlCl_3$ is described in U.S. Pat. No. 3,505,091 which is hereby incorporated by reference.

The pressure for carrying out the reaction is at least about 10 pounds per square inch gage ("PSIG"). Preferably, the pressure will be at least about 15 PSIG and still more preferably at least about 20 PSIG. The upper pressure limit can be the operable limits of the process, e.g., up to about 200 PSIG. Preferably the upper limits will be about 100 PSIG and still more preferably about 70 PSIG. Therefore, typical operating ranges include the following: about 10-200 PSIG, about 10-100 PSIG, about 10-70 PSIG, about 15-200 PSIG, about 15-100 PSIG, about 15-70 PSIG, about 20-200 PSIG, about 20-100 PSIG, and about 20-70 PSIG.

The residence time of the reactants in the mixing zone of the reactor should be at least about 1 millisecond, preferably at least about 2 milliseconds, and most preferably at least about 3 milliseconds. The maximum residence time should be about 16 milliseconds, preferably about 14 milliseconds, and most preferably about 12 milliseconds. Typical ranges of residence times are about 1-16 milliseconds, preferably about 2-14 milliseconds, and most preferably about 3-12 milliseconds. By millisecond is meant $1 \times 10^{-3}$ seconds. By mixing zone is meant the length of the reactor in which substantial mixing of the reactants takes place.

The residence time of the reactants in the mixing zone of the reactor is defined by the formula:

$$RT = \frac{3D}{V}$$

wherein RT=the residence time of the reactants in the mixing zone of the reactor, in seconds, D=the diameter of the reactor mixing zone in feet, measured at about the location where the reactants are first brought together, and V=the velocity of the reactants in feet per second.

The reaction temperature should be at least 800° C. Preferably, it should be about 800°-1800° C., and still more preferably about 900°-1700° C. An especially preferred range is about 950°-1500° C.

The water vapor should be present in an amount of about 50-100,000 parts per million, based on weight of the $TiO_2$ under production. Preferably, the water vapor will be present in an amount of about 0.1% to 3%, based on the weight of $TiO_2$ under production. Any water utilized as a solvent for the nucleant of this invention is considered in the total moisture added as water for nucleation. Any hydrogen-containing organic compound used as a liquid medium, such as benzene, burns in to form water and also acts as the water of nucleation.

As mentioned previously, a spacing gas can be introduced into the reaction chamber. The spacing gas can be useful to prevent the deposition of solids on the inlet areas of the reactor and to control the reaction temperature. The spacing gas should be essentially chemically inert, i.e., it should not react with the reactants or the reaction product under the conditions under which the reaction is conducted.

Examples of suitable spacing gases include chlorine, nitrogen, carbon dioxide, noble gases, and recycle gas, i.e., gas withdrawn from the reactor outlet from which the titanium dioxide has be removed. The amount of the spacing gas should be about 1-100, preferably about 2-50, and most preferably about 5-25 mole percent, based on the titanium tetrachloride and the oxygen reactants.

U.S. Pat. No. 3,208,866 describes procedures for addition of the nucleant, reactors, and reaction conditions, as well as procedures for recovering and using the resulting $TiO_2$ pigment. Such patent is hereby incorporated by reference for such purposes.

The carbon black undertone ("CBU") values mentioned above and used to determine the values for the examples are described in U.S. Pat. No. 2,488,440 using a rating or value of 10 rather than 100 as used in such patent. Such patent is hereby incorporated by reference. A CBU value of 6 represents an acceptable quality pigment, with a preferred product exhibiting a CBU value of 8-16 or higher.

The specific surface area is defined as the surface area of one gram of pigment. It is defined by the formula $$S = \frac{6}{Dia \times Den}$$

wherein
S=the specific surface area in square meters per gram
Dia=the average particle diameter in meters
Den=the density of the pigment in grams per cubic meters The surface area can be determined by gas absorption or by determining the average particle size by use of an electron microscope and then using such particle size to calculate the surface area by use of the above formula. Additional information regarding determining the specific surface area is set forth in T. P. Patton, *Paint Flow and Pigment Dispersion*, 1979, John Wiley and Son, Inc. which is hereby incorporated by reference.

It has been found that the cesium substance of this invention is capable of increasing $TiO_2$ output while still maintaining the targeted or desired level of CBU. For example, to maximize output, a chloride process $TiO_2$ plant is typically operated with the use of KCl, and the output is increased until the CBU falls to the desired level. (Note that there usually is an inverse relationship between $TiO_2$ output and CBU.) At such point, output is maximized, and additional increases in output generally are not possible unless CBU is decreased or expensive new equipment is installed. However, at such point, it has been found that use of the cesium substance of this invention can permit increased product output while still maintaining the desired level of CBU. That is, if the cesium substance of this invention were added at such point, the CBU would increase and the output could then be increased until the CBU decreased to the desired level. It should be noted that such increase in output is highly commercially significant because (1) it is obtained without expensive capital investment, or equipment installations or modifications, and (2) modern chloride process $TiO_2$ plants operate at high rates (i.e. five or more tons per hour), and thus even minor percentage increases in output can result in substantially increased pounds of output. It should be noted that the use of the cesium substance of this invention can increase rate and still maintain the targeted or desired level of CBU whether or not the output is being maximized with KCl.

In a manner similar to that described in the immediately preceding paragraph, the cesium substance of this invention can increase $TiO_2$ output while still maintaining the targeted or desired level of $TiO_2$ gloss. Also, while certain process conditions can increase $TiO_2$ gloss, they generally decrease CBU. Under such process conditions, the use of the cesium substance of this invention can be beneficial to increase CBU.

It is believed that the use of the cesium substance of this invention can also extend the times between maintenance shutdowns and/or provide operating flexibility for chloride $TiO_2$ plants. For example, operation for extended periods of time can increase buildup of reactants, products, and by-products in the process equipment which can increase operating pressure. Also, desired reaction conditions may sometimes require or cause increased pressure. The increased pressure can be a problem by causing an adverse impact on $TiO_2$ CBU, surface area, and gloss, which can require (1) the output to be decreased to restore such properties, or (2) a plant shutdown to remedy the causes of the pressure increase. It is believed that under such conditions of increased pressure, use of the cesium substance of this invention could remedy some or all of such problems and thereby extend the times between maintenance shutdowns and/or provide for greater operating flexibility.

The following examples illustrate the invention. In the examples, the amount of cesium substance used is based on the weight of the alkali metal cation. Examples 1, 2, and 3 were run on separate days. It should be noted that on any given day, the CBU produced can vary, especially under industrial conditions. However, it is seen in all examples that the cesium substance produces improved results compared to the potassium nucleant.

EXAMPLE 1

TiCl$_4$ vapor containing vaporized AlCl$_3$ was heated and continuously admitted to the upstream portion of a vapor phase reactor of the type disclosed in U.S. Pat. No. 3,203,763. Other reactors which can be used are described in U.S. Pat. Nos. 2,833,627; 3,284,159; and 3,505,091. Simultaneously, preheated oxygen was metered through a separate inlet adjacent to the TiCl$_4$ inlet and was continuously admitted to the reaction chamber. A series of runs were made comparing various dosages of CsCl and KCl, each of which was introduced into the hot oxygen stream, in the form of an aqueous solution, just upstream of the mixing zone of the reactor. The amount of CsCl and KCl used is shown in Table I.

The conditions for the reactions were as follows:
TiCl$_4$—22,700 pounds per hour (about 385° C.)
O$_2$—4,700 pounds per hour (about 1530° C.)
AlCl$_3$—240 pounds per hour
Cl$_2$—600 pounds per hour
N$_2$—about 100 pounds per hour
H$_2$O—108 pounds per hour
CO$_2$—388 pounds per hour
Reaction Temperature—about 1350° C.
Pressure—56 pounds per square inch gage
Residence time of reactants in mixing zone of reactor—8.6 milliseconds
Production rate of TiO$_2$-Al$_2$O$_3$—5 tons per hour The gaseous suspension of nucleated TiO$_2$-Al$_2$O$_3$ pigment formed in the reactor was separated from the gas stream at about 110° C. A substantially 100% conversion of titanium tetrachloride and aluminum chloride to their respective oxides, especially rutile in the case of TiO$_2$, was obtained with the resulting composite rutile pigment containing about 99% rutile and 1% Al$_2$O$_3$. The recovered raw titanium dioxide base was then tested for carbon black undertone and specific surface area.

The results of the reactions are summarized in Table I:

TABLE I

| Run No. | Nucleant | Parts Per Million of Nucleant, Based on Weight of TiO$_2$ | Micromoles of Nucleant Per Gram Of TiO$_2$ | Average Carbon Black Undertone | Specific Surface Area (Square Meter/Gram) |
|---|---|---|---|---|---|
| 1. | KCl | 48 | 1.2 | 11.8 | * |
| 2. | KCl | 31 | 0.8 | 11.5 | 6.5 |
| 3. | KCl | 66 | 1.7 | 11.9 | 6.5 |
| 4. | CsCl | 8 | 0.06 | 11.2 | * |
| 5. | CsCl | 20 | 0.15 | 12.5 | * |
| 6. | CsCl | 40 | 0.30 | 13.5 | 6.8 |
| 7. | CsCl | 79 | 0.59 | 14.6 | 6.9 |
| 8. | CsCl | 158 | 1.19 | 14.7 | * |

*Not measured

From the foregoing, the following is observed:
Comparing runs 2 and 6, at similar weight dosages (parts per million), CsCl produced 2 units higher CBU (13.5 vs. 11.5).
Comparing runs 1 and 8, at approximately equal mole dosages of CsCl and KCl, CsCl produced almost 3 units higher CBU (14.7 vs. 11.8).
Comparing runs 1 and 5, at 8 times less CsCl than KCl, on a mole basis, CsCl produced 0.7 higher units of CBU (12.5 vs. 11.8).

EXAMPLE 2

Using a procedure similar to that of Example 1, TiO$_2$ was produced using various dosages of CsCl and KCl. The conditions are summarized below:
TiCl$_4$—18,330 pounds per hour
O$_2$—4,700 pounds per hour
AlCl$_3$—176 pounds per hour
Cl$_2$—510 pounds per hour
CO$_2$—444 pounds per hour
H$_2$O—121 pounds per hour
Reaction Temperature—about 1350° C.
Pressure—53 PSIG
Residence time of reactants in the mixing zone of the reactor—10.7 milliseconds
Production rate of TiO$_2$/Al$_2$O$_3$—3.9 tons per hours
The results are summarized below

TABLE II

| Run No. | Nucleant | Parts Per Million of Nucleant Based on Weight of TiO$_2$ | Micromoles of Nucleant Per Gram of TiO$_2$ | Average Carbon Black Undertone |
|---|---|---|---|---|
| 1 | CsCl | 79 | 0.59 | 13.5 |
| 2 | KCl | 52 | 1.33 | 12.1 |

From the foregoing it is seen that approximately one-half the amount of cesium, on a mole basis, produced a CBU improvement of 1.4 units.

EXAMPLE 3

Using a procedure similar to that of Example 1, TiO$_2$ was produced using various dosages of KCl, Cs$_2$Co$_3$, and CsI. The conditions used are summarized below:
TiCl$_4$—23,220 pounds per hour
O$_2$—4,700 pounds per hour
AlCl$_3$—240 pounds per hour
CO$_2$—730 pounds per hour
CO$_2$—374 pounds per hour
H$_2$O—105 pounds per hour
Reaction Temperature—about 1350° C.
Pressure—54 PSIG
Residence time of reactants in mixing zone of the reactor—8.6 milliseconds
Production rate of TiO$_2$/Al$_2$O$_3$—4.9 tons per hour
The results of the reactions are summarized in Table III below:

TABLE III

| Run No. | Nucleant | Parts Per Million of Nucleant Based on Weight of TiO$_2$ | Micromoles of Nucleant per gram of TiO$_2$ | Average Carbon Black Undertone |
|---|---|---|---|---|
| 1 | KCl | 21 | 0.54 | 14.2 |
| 2 | KCl | 64 | 1.64 | 15.4 |
| 3 | KCl | 129 | 3.3 | 15.2 |
| 4 | Cs$_2$CO$_3$ | 100 | 0.75 | 16.9 |
| 5 | CsI | 119 | 0.90 | 17.1 |

From the foregoing, the following is observed:
Both Cs$_2$CO$_3$ and CSI produce improved carbon black undertone compared to KCl
Comparing runs 3 and 5, less than one-third the amount of cesium, on a mole basis, produced a CBU improvement of 1.9 units.

The invention claimed is:
1. A process for producing pigmentary titanium dioxide which comprises:

(a) reacting titanium tetrachloride and an oxygen containing gas in the vapor phase, at a reaction zone temperature of at least about 800° C., and a pressure of at least 10 pounds per square inch gage, in the presence of water vapor in the amount of about 50–100,000 parts per million, based on the weight of the $TiO_2$ under production, and a nucleant consisting essentially of a cesium substance wherein the cesium substance is present in the amount of about 8–2,000 parts per million, based on the weight of the $TiO_2$ under production, and (b) thereafter recovering the resulting titanium dioxide pigment.

2. The process of claim 1 wherein the cesium substance is present in an amount of about 8–500 parts per million.

3. The process of claim 1 wherein the pressure is about 10–200 PSIG, the temperature is about 800°–1800° C., and the cesium substance is present in an amount of about 8–250 parts per million.

4. The process of claim 1 wherein the pressure is about 10–200 PSIG, the temperature is about 800°–1800° C., and the reaction is carried out in the presence of vaporous $AlCl_3$ in the amount of about 0.1–10% by weight, based on the weight of the titanium tetrachloride and the cesium substance is present in an amount of about 8–200 parts per million.

5. The process of claim 4 wherein a spacing gas is introduced into the reaction zone in the amount of about 5–200 mole percent, based on the titanium tetrachloride and oxygen reactants.

6. The process of claim 1 wherein the pressure is about 15–200 PSIG.

7. The process of claim 2 wherein the pressure is about 15–200 PSIG

8. The process of claim 3 wherein the pressure is about 15–200 PSIG.

9. The process of claim 4 wherein the pressure is about 15–200 PSIG.

10. The process of claim 5 wherein the pressure is about 15–200 PSIG.

11. The process of claim 1 wherein the pressure is about 20–200 PSIG.

12. The process of claim 2 wherein the pressure is about 20–200 PSIG.

13. The process of claim 3 wherein the pressure is about 20–200 PSIG.

14. The process of claim 4 wherein the pressure is about 20–200 PSIG.

15. The process of claim 5 wherein the pressure is about 20–200 PSIG.

16. In a process for producing pigmentary titanium dioxide involving reacting titanium tetrachloride in the vapor state and an oxygen containing gas in the presence of water vapor and nucleant, the specific improvement comprising:

(a) mixing and reacting the titanium tetrachloride and the oxygen containing gas with a residence time of reactants in the mixing zone of the reactor of from about 1 to 16 milliseconds at a reaction zone temperature of at least about 800° C. and a pressure of at least 10 pounds per square inch gage, in the presence of water vapor in the amount of about 50 to 100,000 parts per million, based on the weight of the $TiO_2$ under production, and in the presence of an effective amount of a nucleant consisting essentially of a cesium substance to achieve improved CBU and improved specific surface area, wherein the cesium substance is present in the amount of about 8 to 2,000 part per million, based on the weight of the $TiO_2$ under productions, and (b) thereafter recovering the resulting titanium dioxide pigment characterized by improved CBU, gloss and specific surface area.

17. The improved process of claim 16 wherein the residence time of the reactants in the mixing zone of the reactor is about 2–14 milliseconds.

18. The improved process of claim 16 wherein the residence time of the reactants in the mixing zone of the reactor is about 3–12 milliseconds.

19. A process for producing pigmentary titanium dioxide which comprises:

(a) reacting titanium tetrachloride and an oxygen containing gas in the vapor phase, at a reaction zone temperature of at least about 800° C., and at a residence time of the reactants in the mixing zone of the reactor of about 1–16 milliseconds, in the presence of water vapor in the amount of about 50–100,000 parts per million, based on the weight of $TiO_2$ under production, and a nucleant consisting essentially of a cesium substance wherein the cesium substance is present in an amount of about 8–2,000 parts per million, based on the weight of the $TiO_2$ under production, and (b) thereafter recovering the resulting titanium dioxide pigment.

20. The process of claim 19 wherein the residence time of the reactants in the mixing zone of the reactor is about 2–14 milliseconds.

21. The process of claim 19 wherein the residence time of the reactants in the mixing zone of the reactor is about 3–12 milliseconds.

22. The process of claim 19 wherein the $TiO_2$ nucleant is present in an amount of about 8–500 parts per million.

23. The process of claim 19 wherein the temperature is about 800°–1800° C. and the cesium substance is present in an amount of about 8–250 parts per million.

24. The process of any one of claims 19–23 wherein the temperature is about 800°–1800° C., and the reaction is carried out in the presence of vaporous $AlCl_3$ in the amount of about 0.1–10% by weight, based on the weight of the titanium tetrachloride.

25. The process of any one of claims 19–23 wherein a spacing gas is introduced into the reaction zone in the amount of about 5–200 mole percent, based on the titanium tetrachloride and oxygen reactants, the temperature is about 800°–1800° C., and the reaction is carried out in the presence of vaporous $AlCl_3$ in the amount of about 0.1–10% by weight based on the weight of the titanium tetrachloride.

* * * * *